United States Patent [19]
Clenet

[11] 3,963,158

[45] June 15, 1976

[54] COMBINED EXTENSIBLE CARRIER AND ELECTRICAL WIRE SHEATH

[75] Inventor: Alain Jean-Marie Clenet, Ventura, Calif.

[73] Assignee: W. R. Grace & Co., New York, N.Y.

[22] Filed: Aug. 16, 1974

[21] Appl. No.: 498,044

[52] U.S. Cl. .............................. 224/31; 224/32 A; 224/39
[51] Int. Cl.² ........................................ B62J 7/04
[58] Field of Search ................. 224/30 R, 32 R, 31, 224/32 A, 33, 37, 38, 39 R; 340/93, 87, 134, 90; 240/7.55, 8.3

[56] References Cited
FOREIGN PATENTS OR APPLICATIONS

| | | | |
|---|---|---|---|
| 616,511 | 7/1935 | Germany | 224/32 A |
| 270,732 | 12/1950 | Switzerland | 224/32 A |

Primary Examiner—Robert J. Spar
Assistant Examiner—Jerold M. Forsberg
Attorney, Agent, or Firm—Lindenberg, Freilich, Wasserman, Rosen & Fernandez

[57] ABSTRACT

A carrier mounted at the rear of a motorcycle is designed to hold a variety of goods, including a special pack that can hold a tent and sleeping bags, and the carrier and pack are designed to minimize interference with good motorcycle travel. The carrier has a front frame section mounted at the rear fender of the motorcycle, a rear frame section which can be locked in forward and rearward positions, and a flexible sheet connecting the front and rear frame sections. The pack is wider and taller than the motorcycle seat, and can be arranged with a recess in its front for receiving the rear of the seat, so that when only one person rides on the motorcycle the pack lies immediately behind the rider to minimize aerodynamic disturbances and to keep the center of gravity forward.

2 Claims, 7 Drawing Figures

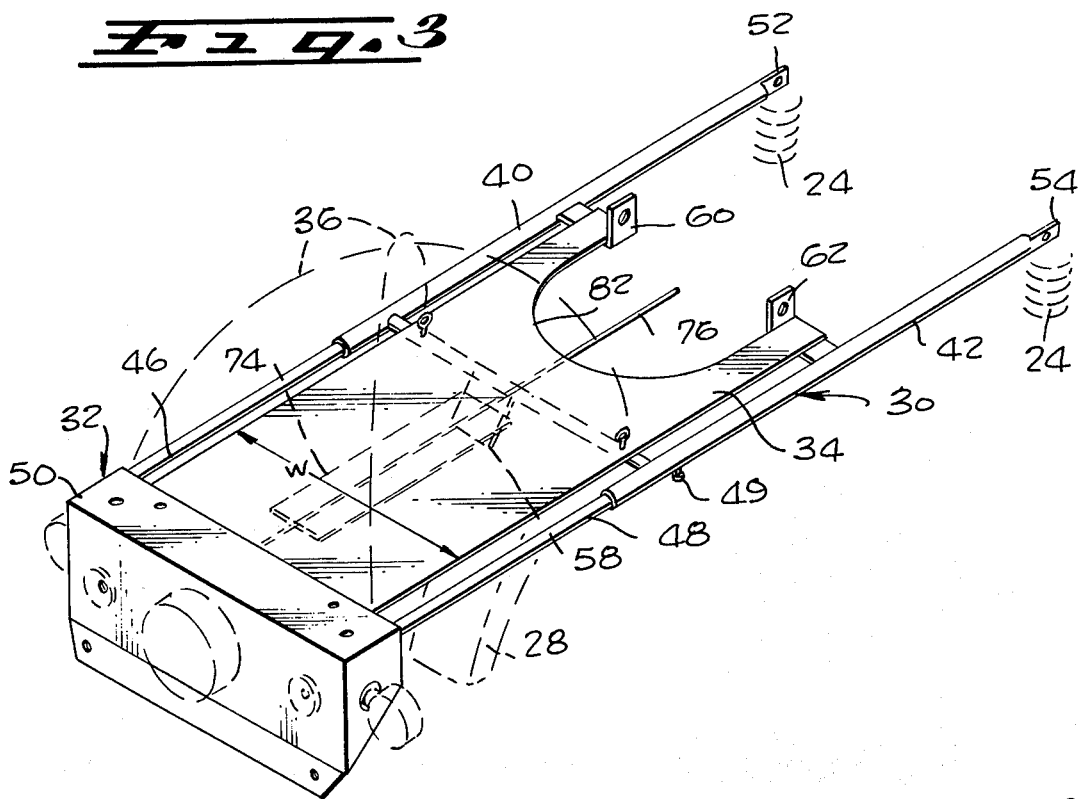
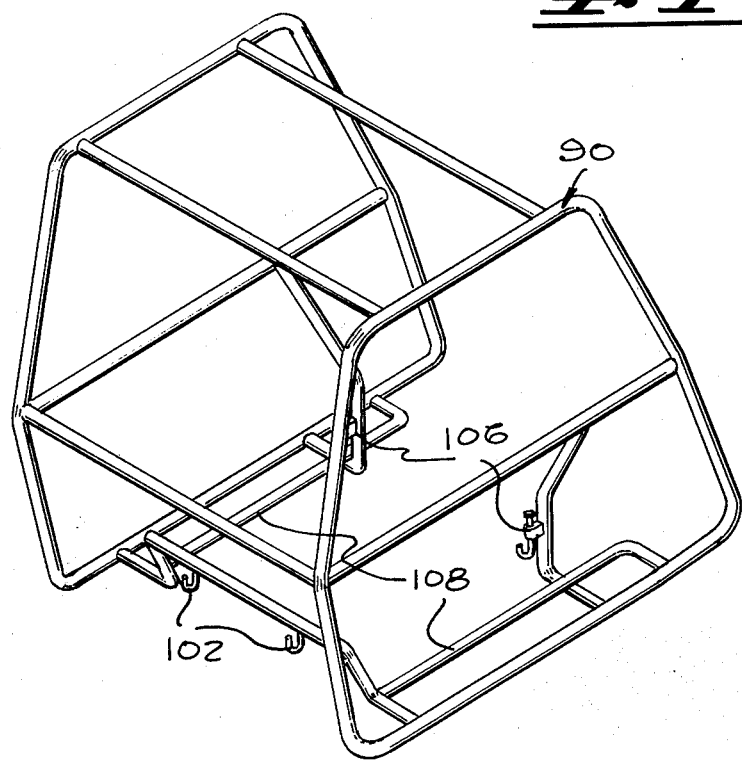

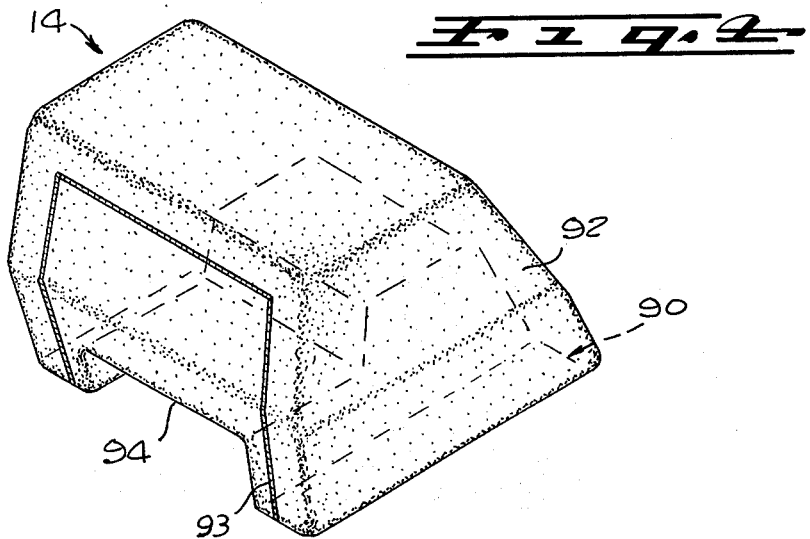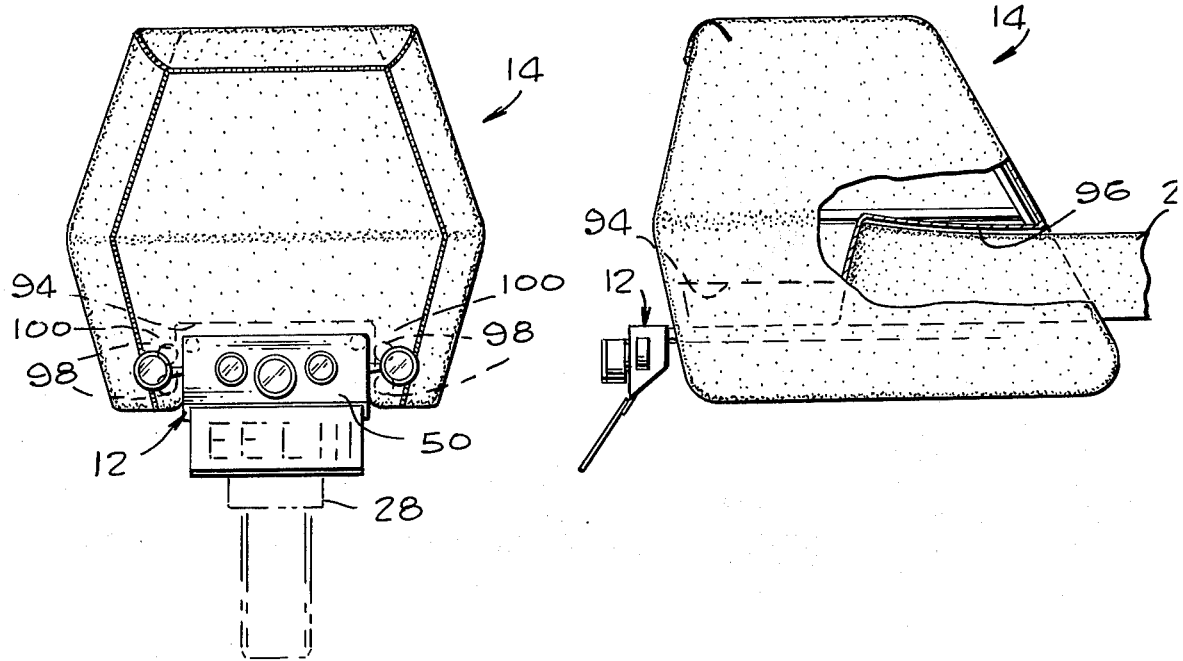

COMBINED EXTENSIBLE CARRIER AND ELECTRICAL WIRE SHEATH

BACKGROUND OF THE INVENTION

This invention relates to carrier and pack accessories designed for carrying on a motorcycle.

Motorcycles are sometimes used to carry maximum loads, as where two riders travel with sleeping bags or other shelter, and are sometimes utilized to carry a minimum load, as where a single rider travels with little or no load behind him. A carrier can be readily designed for any loading, but it generally does not serve well at other load levels. For example, a long carrier can be mounted on the rear of a motorcycle to carry heavy loads and still allow two riders to be carried, with the relatively poor riding characteristics being acceptable to the motorcyclists under these conditions. However, when there is only one rider or only a small load, a long carrier causes greater interference with riding characteristics than is desirable. In a similar manner, a pack for holding a tent, sleeping bags and other goods on a motorcycle carrier may cause a greater interference with riding characteristics than necessary if the pack is designed only for "worst case" or heaviest loading conditions. A major factor in determining riding characteristics is whether the center of gravity remains at the original location. Thus, a large load may be carried on a long carrier, if there are two riders to prevent a large rearward shift in the center of gravity, while such a loading may lead to a critical "wobble" condition if there is only one rider.

SUMMARY OF THE INVENTION

In accordance with one embodiment of the present invention, a motorcycle-mounted carrier and pack assembly is provided which produces minimum interference with motorcycle riding at any loading level. The carrier includes a front fixed frame section mounted on the motorcycle frame, a rear sliding frame section, and a sheet of flexible material which is connected to the front and rear frame sections. The rear frame section can slide to a forward position, so there is minimal overhang behind the motorcycle when there is only a small load to be carried, and can slide to a rearward position for holding a large load. The flexible sheet provides a large platform when the rear frame section is slid rearwardly, to hold a large amount of goods. However, when the rear frame section is slid to its forward position, the flexible sheet can fold down into a storage loop where it is out of the way. The rear frame section has a bracket on which the rear light and turn signal lights are mounted to assure good visibility of the lights and to comply with laws governing light locations. Electrical wires connecting the electrical system of the motorcycle to the lights, extend through a sheath formed on the lower side of the flexible sheet, so that the wires are securely retained against entanglement when the rear frame section is in either its forward or rearward position.

A pack which is designed especially to hold a tent, stove, and one or two mattresses and sleeping bags, has a height and width greater than the seat on the motorcycle. When only one mattress and sleeping bag are carried, which is the usual case when there is only one rider, the pack can be formed with a recess at the front. With the pack mounted on the carrier and the carrier in its compacted configuration, the pack recess receives the rear of the seat. This results in the pack lying immediately behind the single rider, so that there is no large air space between the rider and pack. The absence of such a space results in the motorcycle having good aerodynamic characteristics to minimize the possilibty of developing a wobble effect. On the other hand, when there are two mattresses and bags for two riders, the second mattress and bag fill the recess in the pack, and the pack can be carried by extending the carrier rearwardly so the pack lies behind the rear seat. Even in this configuration, there is no large air gap between the rear rider and the pack.

The novel features that are considered characteristic of this invention are set forth with particularly in the appended claims. The invention will best be understood from the following description when read in connection with the accompanying drawings.

BRIEF DESCRIPTION OF THE DRAWINGS

FIG. 3 is a view similar to FIG. 2, but showing the carrier in an extended configuration;

FIG. 4 is a perspective view of the pack of FIG. 1;

FIG. 5 is a rear view of the motorcycle of FIG. 1;

FIG. 6 is a partial side elevation view showing the pack of FIG. 5; and

FIG. 7 is a perspective view of the pack frame of the pack of FIG. 4.

DESCRIPTION OF THE PREFERRED EMBODIMENTS

Figure 1:
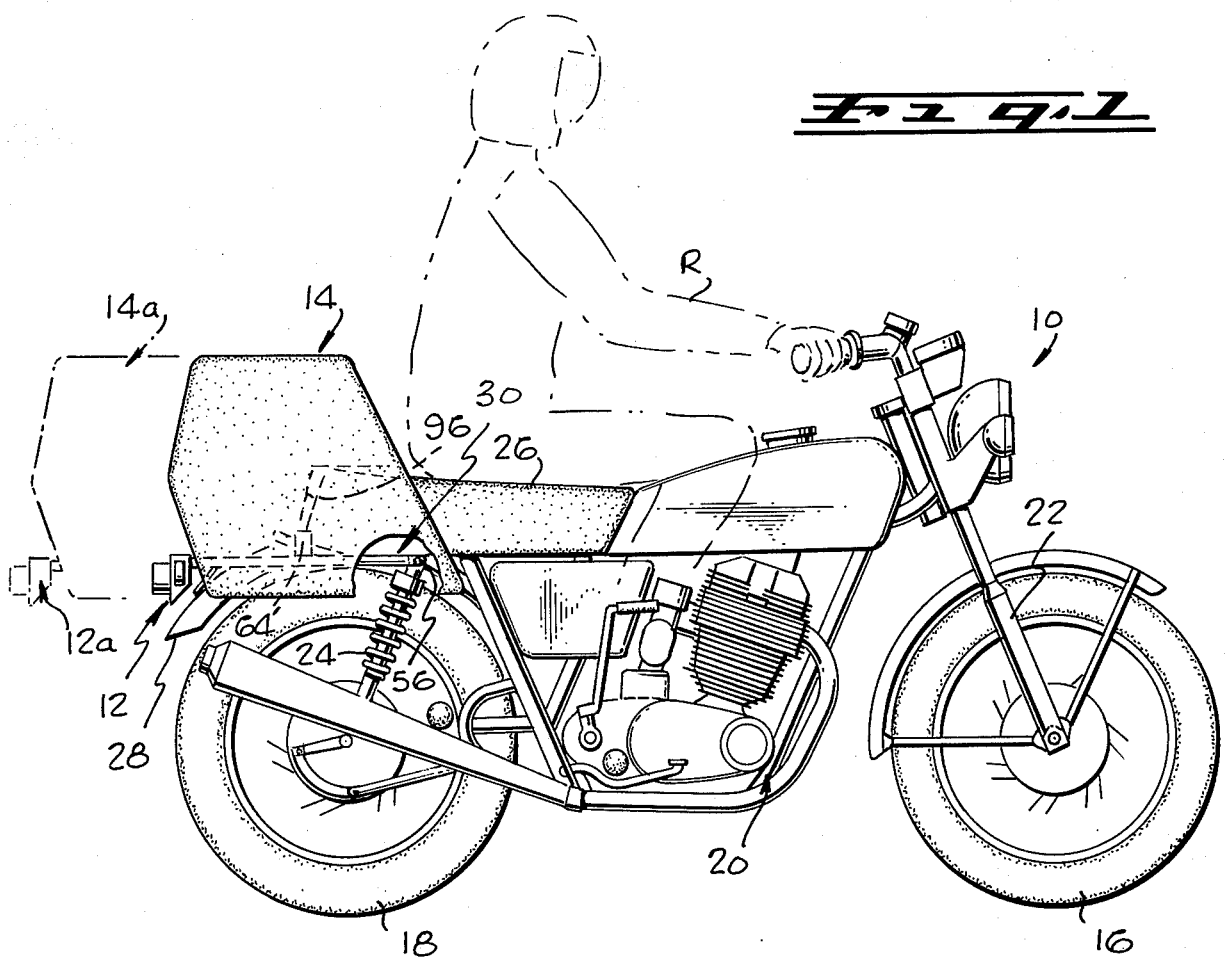
FIG. 1 is a side elevation view showing the configuration of the carrier and pack on a motorcycle when there is only one rider, and also indicating in phantom lines the change in configuration for accommodating two riders.

FIG. 1 illustrates a motorcycle 10, a carrier 12 of the present invention mounted on the motorcycle, and a camper pack 14 of the present invention mounted on the carrier. The motorcycle includes wheels 16, 18, a motorcycle frame 20, and shock absorbers 22, 24 that support the frame on the wheels. A seat 26 on the motorcycle frame is long enough to support two riders, but is often utilized to support only a single rider R as illustrated in the figure. The carrier 12, which is mounted on the rear fender 28 of the motorcycle frame, and the pack 14 on the carrier, assume the configuration shown in solid lines in FIG. 1 when only one rider rides the motorcycle. However, when it is desired to carry two riders, the carrier is moved to the configuration 12a, and it then holds the pack at the position 14a to leave the rear portion of the seat unobstructed.

Figure 2:
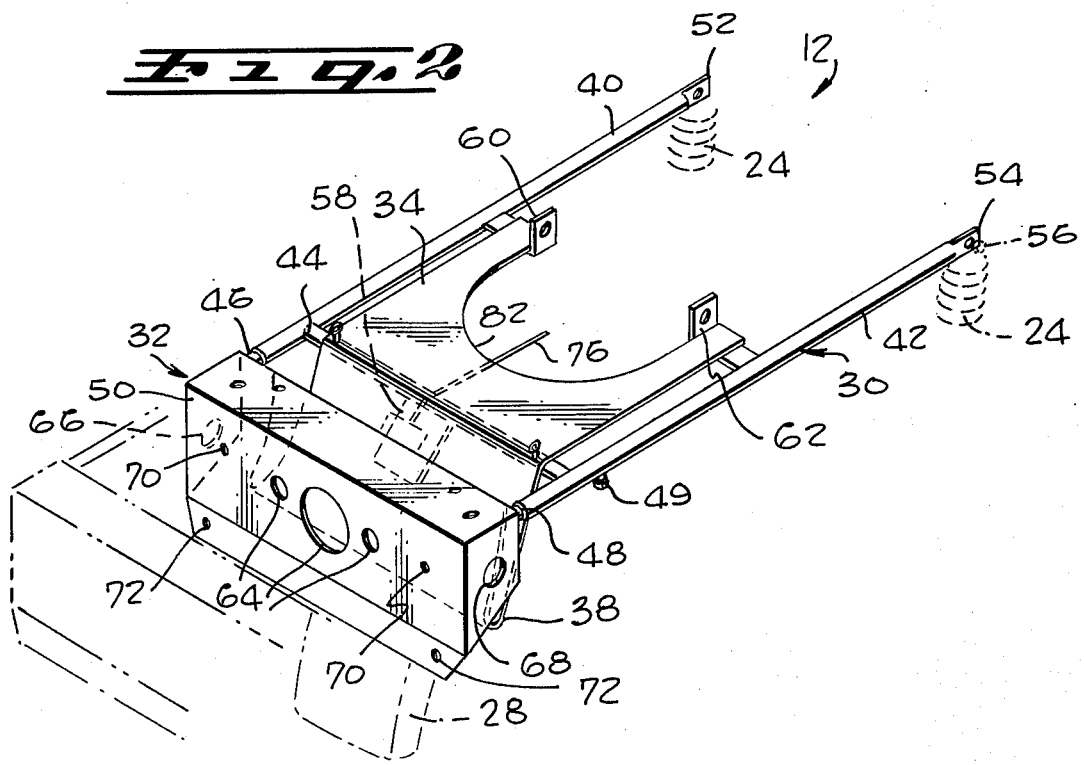
FIG. 2 is a perspective view of the carrier of FIG. 1, shown in a compacted configuration.

As shown in FIGS. 2 and 3, the carrier 12 includes a front section 30 which is rigidly mounted on the motorcycle. A rear section 32 which is slideably mounted on the front section 30. A sheet 34 of tough flexible material such as vinyl plastic has a front end held on the front frame section 30 and a rear end held on the rear frame section 32. When the carrier is in an extended configuration, as shown in FIG. 3, the sheet 34 is held taut or nearly taut, so that it provides a large platform on which goods can be placed. Such goods may be the pack 14, or may be books or other items that can be held down by bungee cords indicated at 36. On the other hand, when the carrier is compacted, as shown in FIG. 2, the flexible sheet 34 forms a downwardly extending loop 38 that can be received at the rear of the motorcycle rear fender 28.

The front frame section 30, which is mounted at the rear of the seat and under it, includes a pair of tubes 40, 42 (FIG. 3) that extend parallel to one another and which lie at either side at the motorcycle rear fender. A cross member 44 connects the rear portions of the tubes 40, 42 together. The rear frame section 32 includes a pair of guide members 46, 48 in the form of narrow tubes, that are slideably received in the tubes 40, 42 to enable the rear frame section to slide forwardly and rearwardly. A spring loaded locking pin 49 retains the rear frame section in either the forward or rearward positions. A bracket 50 connects the rear ends of the guide members 46, 48. The carrier front frame section is mounted on the motorcycle frame at several points, including at the front tube portions 52, 54 which have holes that receive the bolts 56 that connect the upper ends of the rear shock absorbers 24 to the motorcycle frame. The front frame section is also connected to the motorcycle frame by a mounting bracket 58 which mounts on the rear fender 28 at the location where a rear light would otherwise be positioned. In addition, a pair of brackets 60, 62 extending inwardly from the tubes 40, 42 mount on the rear fender at locations 64' where turn signal lights would otherwise be mounted on the fender. For a typical motorcycle, mounting of the front fixed carrier frame section 30 can be accomplished without drilling additional holes into the motorcycle frame, but instead by removing the rear lights on the fender, and by utilizing the bolt that holds the rear shock absorbers 24 to the motorcycle frame.

The carrier 12 would cover the various light and reflectors normally present on the rear fender of a motorcycle if they were allowed to remain in their original positions. In order to allow these lights to be carried where they are easily seen while the carrier is mounted on the motorcycle, the lights are remounted on the bracket 50 of the carrier rear frame section. The bracket 50 has a group of three holes 64 for mounting a rear light, a pair of side holes 66, 68 for mounting turn signal lights, a pair of holes 70 for mounting reflectors and a pair of holes 72 for mounting a license plate. The lights and reflectors are obtained by merely removing the corresponding lights from the frame of the motorcycle and mounting them on the bracket 50. However, the delivery of current to electric lights on a bracket 50 that can move back and forth, can present some problems. If the wires are long enough to reach the brackets 50 when it is in its rearward position, then the wires may become entangled in the apparatus when the bracket 50 is moved to its forward position. To prevent this, the flexible sheet 34 is provided with a flexible sheath 74 on its lower side, and a plurality of flexible wires or wire harness 76 is provided which extends through the sheet 74 and which connects the lights (indicated at 78–80 in FIG. 3) to the electrical system of the motorcycle. The electrical system includes a generator and switches for connecting the generator to the wire harness 76. When the rear frame section 32 is moved rearwardly, the wire harness 76 is almost straight. However, when the rear frame section is moved forwardly as in FIG. 2, the wire harness 76 is maintained at a controlled position by the fact that it is maintained in the storage loop 38 of the flexible sheet 34. The flexible sheet 34 has a width W which is less than the separation of the tubes 40, 42, so that the sheet can readily fall into the loop 38 between the tubes. The flexible sheet has a recess 82 at its front end which lies over the rear fender and under the motorcycle seat, while the sheet portions on the bracket 60, 62 are held on either side of the seat.

The pack 14, which is best shown in FIGS. 4–7, includes a frame 90, and a canvas cover 92 with a zipper 93, disposed about most of the frame. The pack forms a tunnel 94 in its lower face, which is wide enough to receive the tubes 40, 42 and guides 46, 48 of the carrier frame, so that the pack can ride relatively low on the motorcycle. The pack is designed particularly to hold a tent, stove, and one or two sleeping mattresses and bags, and can also hold small amounts of additional goods such as a change of clothing. In situations where only one rider will ride the motorcycle, the pack is formed with a large recess 96 (FIG. 6) in its front lower portion, with the recess being wide and tall enough to receive the rear of the motorcycle seat 26. This allows the pack to lie close behind the motorcycle rider R as shown in FIG. 1. Placing the pack close behind the rider helps in the riding characteristics of the motorcycle, because it avoids a large gap that would produce a suction effect behind the rider during rapid travel. Instead, there is only a small gap behind the rider, and any suction effect tends to occur behind the pack 14. In those cases where two riders will travel on the motorcycle, the carrier can be extended so that the pack 14 moves rearwardly to the position 14a shown in FIG. 1, so that a second rider can be accommodated on the seat. In this situation, the recess portion 96 of the pack can be filled with a second sleeping bag and additional clothing that are normally required for the second rider. Thus, moving the pack rearwardly not only provides additional seating for a second rider, but also provides additional pack space for the goods required by the second rider.

In assembling the pack, heavy portions such as the tent stakes and poles 98 are positioned in the straddle portions 100 of the pack, which lie at the bottom of the pack on either side of the carrier 12. This helps maintain a low center of gravity for the motorcycle to increase its stability. The pack is held down to the motorcycle and carrier by a pair of hooks 102 at the rear of the pack frame, and by a pair of quick-disconnect fasteners 106 which can engage the tubes 40, 42 of the carrier frame. The pack frame 90 includes a pair of lower bars 108 which define the width of the tunnel 94 which receives the carrier. However, the area above the tunnel is not obstructed by the front of the frame, so that the recess 96 can be formed therein to receive the motorcycle seat. A person can place the pack on the carrier with the carrier in a compacted position, so that the recess 96 is formed in the canvass cover where it receives the seat, and goods can then be inserted into the pack to fill it.

Thus, the invention provides a carrier and pack for a motorcycle, which provides optimum motorcycle handling characteristics for a variety of loading. The rear of the carrier can slide between forward and rearward positions so that a large amount of goods can be carried when required, and yet when few or no goods are to be carried there is minimal interference with good motorcycle handling. The carrier provides a bracket for mounting electric lights, and a flexible sheet on the carrier provides a sheath for holding the electrical wires leading to the lights to guide the wires and thereby prevent entanglement at both forward and rearward positions of the rear carrier frame section. The pack is designed to hold considerable goods and yet to provide a low center of gravity by allowing side portions of the pack, where tent poles or other heavy goods may be carried, to lie below the top of the carrier. In addition, the pack frame is formed so that it can receive the rear portion of the seat and thereby lie close behind a single rider. When two persons will ride, however, the pack can be more fully loaded and moved backward to lie behind the seat.

Although particular embodiments of the invention have been described and illustrated herein, it is recognized that modifications and variations may readily occur to those skilled in the art and consequently it is intended that the claims be interpreted to cover such modifications and equivalents.

The embodiments of the invention in which are exclusive property or privelege is claimed are defined as follows:

1. In combination with a motorcycle having a seat, the improvement of a carrier comprising:
 a front frame section fastened to said motorcycle and lying at the rear of the seat;
 a rear frame section positioned behind said front section and slideable forwardly and rearwardly toward and away from said front section;
 at least one electric light mounted on said rear frame section for energization from wires leading from the motorcycle;
 retainer means for retaining said rear frame means at forward and rearward positions with respect to said front frame section; and
 sheet means of tough flexible material having a front portion attached to said front frame section and a rear portion attached to said rear frame section, whereby the sheet means provides a cargo supporting platform when the rear frame section is moved rearwardly and yet the sheet means enables the rear frame section to be moved forwardly to optimize motorcycle handling characteristics;
 said flexible sheet means defining a flexible sheath, for holding said wires leading to said light at both said forward and rearward positions of said rear frame section.

2. In a motorcycle and carrier assembly which includes a motorcycle having front and rear wheels, a motorcycle frame with front and rear fenders over the wheels, with an electrical system, a seat mounted on the frame, and shock absorbers having lower ends coupled to the wheels and upper ends coupled to the motorcycle frame, the improvement comprising:
 a front carrier frame section having a pair of laterally spaced parallel tubes lying on either side of said rear fender and attached to the motorcycle frame, said rear carrier frame section including a rear cross member extending between said tubes and supported on the motorcycle frame;
 a rear carrier frame section having a pair of elongated guide members with their front portions slideably received in said tubes and having a light bracket connecting the rear ends of the guide members;
 locking means for locking said rear frame section at forward and rearward positions with respect to said front frame section;
 at least one electrically energizable light mounted on said light bracket;
 a flexible wire assembly which includes at least two wires extending from the electrical system of said motorcycle along said carrier frame sections to said light on said light bracket; and
 a sheet of flexible material having a front end fastened to said front carrier frame section and a rear end fastened to said rear carrier frame section, said sheet being no wider than the spacing of said tubes to permit the sheet to drop in a storage loop between the tubes near the rear of the rear fender when the rear carrier frame section is moved to a forward position, and said sheet forming a sheath that surrounds said flexible wire assembly.

* * * * *